United States Patent
Shah et al.

(10) Patent No.: US 10,860,254 B2
(45) Date of Patent: Dec. 8, 2020

(54) THROTTLING RESYNCHRONIZATION OPERATIONS IN A DATA STORE CLUSTER BASED ON I/O BANDWIDTH LIMITS

(71) Applicant: VMware, Inc., Palo Alto, CA (US)

(72) Inventors: Mansi Shah, San Jose, CA (US); Varun Shah, Fremont, CA (US); Vishnu Rajula, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 63 days.

(21) Appl. No.: 16/387,433

(22) Filed: Apr. 17, 2019

(65) Prior Publication Data
US 2020/0333977 A1    Oct. 22, 2020

(51) Int. Cl.
    *G06F 3/06*    (2006.01)
(52) U.S. Cl.
    CPC .......... *G06F 3/0659* (2013.01); *G06F 3/0604* (2013.01); *G06F 3/067* (2013.01); *G06F 3/0653* (2013.01)
(58) Field of Classification Search
    CPC .... G06F 3/0658; G06F 3/0604; G06F 3/0653; G06F 3/067
    See application file for complete search history.

(56) References Cited

U.S. PATENT DOCUMENTS 9,563,369 B2 *   2/2017   Quach ................... G06F 3/0631

OTHER PUBLICATIONS

C. Melo et al., "Availability models for hyper-converged cloud computing infrastructures," 2018 Annual IEEE International Systems Conference (SysCon), Vancouver, BC, 2018, pp. 1-7. (Year: 2018).*

* cited by examiner

*Primary Examiner* — Khoa D Doan

(57) ABSTRACT

The disclosure herein describes throttling resynchronization operations in a cluster of distributed data stores based on I/O bandwidth limits. Resynchronization operations are added to a queue as they are received. A cluster resource manager accesses a resynchronization operation in the queue. A transient capacity value is determined and an available capacity value is obtained. A resynchronization limit of the cluster is identified, wherein the resynchronization limit indicates a maximum percentage of I/O bandwidth of the cluster that is for use by resynchronization operations. Based on a sum of the resynchronization capacity value and the transient capacity value being less than or equal to a product of the resynchronization limit and the available capacity value, the cluster resource manager initiates the accessed resynchronization operation on the cluster, whereby free space is maintained in the cluster for use by user operations.

20 Claims, 5 Drawing Sheets

THROTTLING RESYNCHRONIZATION OPERATIONS IN A DATA STORE CLUSTER BASED ON I/O BANDWIDTH LIMITS

BACKGROUND

In computing environments that make use of hyperconverged infrastructure (HCI), computation, storage, and networking is combined by providing a network of servers that can be accessed by users via client devices. In HCI systems that are configured to enable users to store data within the network, stored data may be moved from one data store to another for a variety of reasons, including externally triggered actions such as a change in a setting or policy used for data storage or internally triggered actions such as moving data to rebalance the utilization of the cluster storage resources. Such data movement operations, or resynchronization operations, require the copying of the data being moved to the new location before releasing the original data location for other use, thereby causing a temporary storage utilization spike that can result in reducing free storage resources for other purposes, such as for use by users of the system. In some cases, the temporary utilization spike occupies all the free space on the cluster, resulting in severe user impact.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for throttling data storage usage by resynchronization operations in a cluster of distributed data stores based on input/output (I/O) bandwidth limits is described. Based on receiving a proposed resynchronization operation associated with the cluster, a cluster resource manager adds the proposed resynchronization operation to a queue data structure. The cluster resource manager accesses a resynchronization operation in the queue data structure, wherein the accessed resynchronization operation includes a resynchronization capacity value indicating an amount of data storage space of the cluster to be used during performance of the accessed resynchronization operation. A total transient capacity value indicating an amount of data storage space of the cluster that is used by resynchronization operations is determined and an available capacity value indicating an amount of data storage space of the cluster that is available for use is obtained. A resynchronization limit of the cluster is identified, wherein the resynchronization limit indicates a maximum percentage of input/output (I/O) bandwidth of the cluster that is for use by resynchronization operations. Based on a sum of the resynchronization capacity value and the transient capacity value being less than or equal to a product of the resynchronization limit and the available capacity value, the cluster resource manager initiates the accessed resynchronization operation on the cluster, whereby free space is maintained in the cluster for use by user operations.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Figure 1:
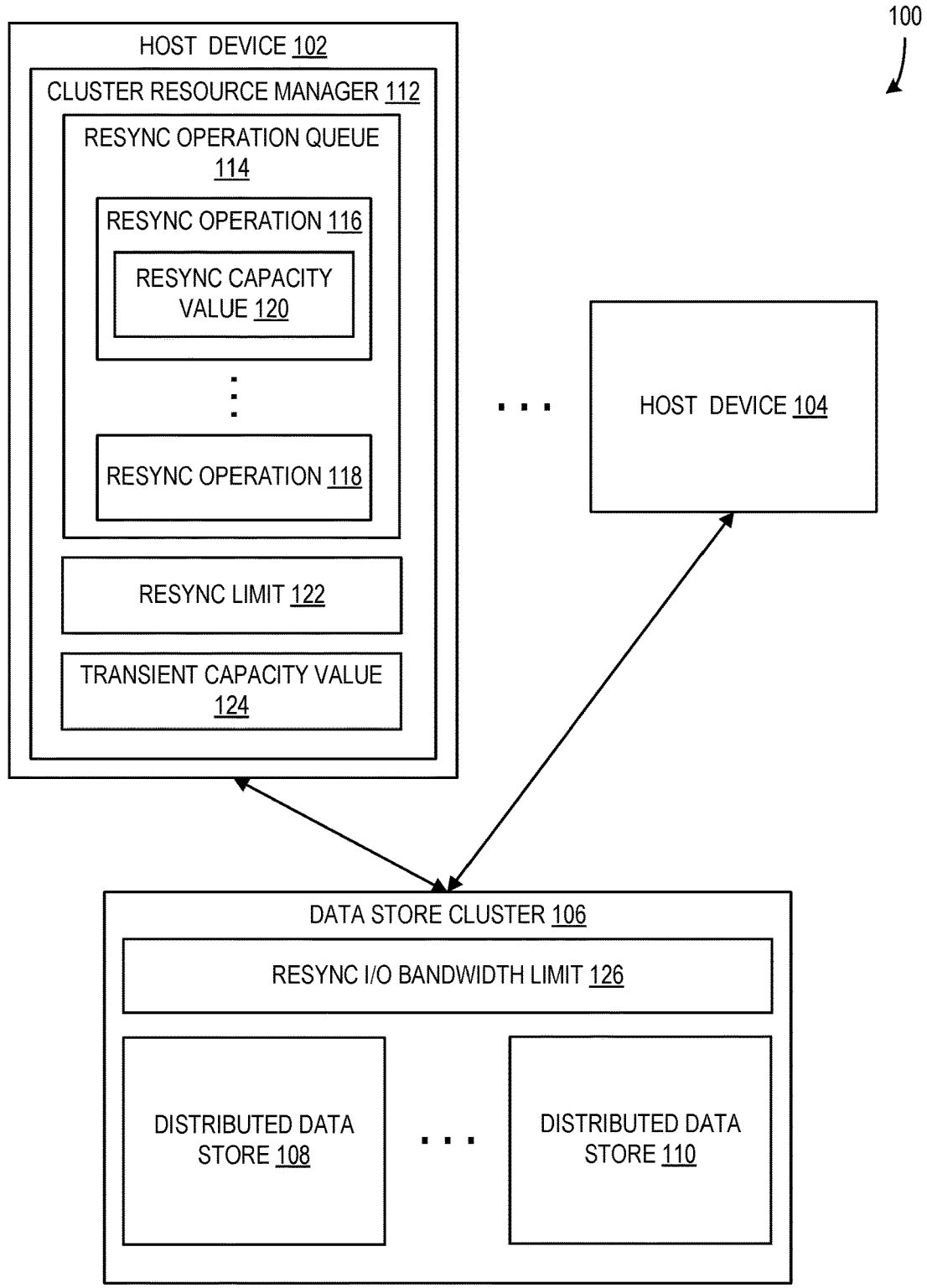
FIG. 1 is a block diagram illustrating a system configured for throttling data storage usage by resynchronization operations in a cluster of distributed data stores based on input/output (I/O) bandwidth limits according to an embodiment.

Aspects of the disclosure provide a computerized method and system for throttling resynchronization operations in a cluster of distributed data stores based on input/output (I/O) bandwidth limits to control data storage usage. Based on receiving a proposed resynchronization operation associated with the cluster, a cluster resource manager adds the proposed resynchronization operation to a queue data structure. The cluster resource manager accesses a resynchronization operation in the queue data structure and evaluates whether the operation should be performed based on current cluster capacity data values. A total transient capacity value indicating an amount of data storage space of the cluster that is used by resynchronization operations is determined and an available capacity value indicating an amount of data storage space of the cluster that is available for use is obtained. A resynchronization limit of the cluster is identified, wherein the resynchronization limit indicates a maximum percentage of input/output (I/O) bandwidth of the cluster that is for use by resynchronization operations. Based on a sum of the resynchronization capacity value and the transient capacity value being less than or equal to a product of the resynchronization limit and the available capacity value, the cluster resource manager initiates the accessed resynchronization operation on the cluster, whereby free space is maintained in the cluster for use by user operations.

The disclosure handles proposed resynchronization operations in such a way that new resynchronization operations are only initiated when there is sufficient available storage capacity in the cluster such that the resynchronization operations being performed do not interfere with the storage needs of other applications on the system, such as user applications. The disclosure operates in an unconventional way by deriving a resynchronization operation storage capacity limit from a defined resynchronization I/O bandwidth limit and automatically initiating queued resynchronization operations based on the derived limit. Because the cluster limits the percentage of I/O bandwidth that can be used by resynchronization operations and the rate at which resynchronization operations and other operations can consume and use free storage space on the cluster is dependent on the I/O bandwidth limit, the resynchronization operation storage capacity limit prevents interference by resynchronization operations with storage space capacity needs of the other applications. The disclosure further enables resynchronization operations to be performed based on defined priority order and provides for a lock module that prevents more than one host device from initiating resynchronization operations at the same time.

With the disclosure, resynchronization operations are performed in a timely manner to keep the distribution of data in the cluster up to date thereby enhancing the performance of the cluster in general and benefitting users of the system. Aspects of the disclosure balance the performance of background processes, such as resynchronization operations, against how the users of the systems are negatively affected.

FIG. 1 is an exemplary block diagram illustrating a system 100 configured for throttling data storage usage by resynchronization operations (e.g., resynchronization operations 116-118) in a cluster 106 of distributed data stores 108-110 based on an input/output (I/O) bandwidth limit 126 according to an embodiment. The system includes host devices 102-104 configured for interacting with the data store cluster 106 and the distributed data stores 108-110 therein.

In some examples, the host devices 102-104 are computer devices that are configured for executing software programs and interacting with the data store cluster 106 such as by issuing input/output (I/O) requests to the cluster 106 to write data to the distributed data stores 108-110 and/or to retrieve data from the distributed data stores 108-110. Further, in virtualization examples, the host devices 102-104 are configured for executing guest systems, such as virtual computing instances (VCIs) (e.g., virtual machines (VMs), containers, or other types of VCIs) and enabling such guest systems to make use of the cluster 106 for distributed data storage. Alternatively, or additionally, the host devices 102-104 and the system 100 are generally operable in non-virtualized implementations and/or environments without departing from the description herein.

The data store cluster 106 includes hardware, firmware, and/or software configured to enable access and interactions with the distributed data stores 108-110 by the host devices 102-104 and/or other computing devices. In some examples, the cluster 106 is configured to include interfaces that enable the storage of data associated with guest systems or other software applications being executed on the host devices 102-104 on the distributed data stores 108-110 according to distributed data storage principles, including storing files and/or data structures across multiple data stores, storing files and/or data structures redundantly on multiple data stores, accessing stored data on multiple data stores in parallel processes, etc. Further, I/O requests associated with background processes for managing and/or maintaining the distributed data stores 108-110, such as resynchronization operations, or "resync" operations (e.g., resync operations 116-118), are enabled via interfaces of the data store cluster 106.

Additionally, the data store cluster 106 includes a resync I/O bandwidth limit 126 that indicates a maximum amount and/or percentage of the I/O bandwidth of the cluster 106 that can be used by resync operations. For instance, in some examples, the resync I/O bandwidth limit 126 is set to 20% of the total I/O bandwidth of the cluster 106, such that resync operations are prevented from using more than 20% of the total I/O bandwidth of the cluster 106 at a time, reserving the other 80% of the bandwidth for use by other programs, such as guest systems hosted on the host devices 102-104. The limit is defined to prevent resync operations and/or other background processes from negatively affecting the performance of the system with respect to hosted guest system processes such as user-facing applications. The bandwidth limit 126 may be defined by technicians, engineers, or other users that maintain the cluster 106 and/or other components of the system 100. Further, a user with sufficient access to the configuration of the cluster 106 may change the limit to improve or tune the performance of the cluster 106.

While, in many described examples herein, the bandwidth limit 126 is based on limiting the bandwidth use of resync operations in comparison to all other operations, in alternative examples, the set of operations that uses the I/O bandwidth of the cluster 106 is divided into more and/or different operation categories and one or more of the operation categories are assigned bandwidth limits as described herein. For instance, the operations may be split into three categories with associated bandwidth limits: resync operations with a 15% bandwidth limit, low-priority user application operations with a bandwidth limit of 35%, and high-priority user application operations with a bandwidth limit of 50%. Alternatively, some of the categories may be configured to use any amount of available bandwidth (e.g., the high-priority user application operations may be configured to make use of more than 50% of the total bandwidth when possible).

The host device 102 includes a cluster resource manager 112 that is configured for initiating, scheduling, or otherwise managing the resync operations associated with data stored by the host device 102 and/or VCIs or other guest systems hosted on the host device 102. The cluster resource manager 112 includes a resync operation queue 114 storing proposed resync operations 116-118 that are to be performed, a resynchronization limit, or resync limit 122, and a transient capacity value 124 indicating an amount of storage capacity that is currently occupied by resync operations and/or other background processes of the host device 102 and/or other host devices (e.g., host device 104) in the system 100. In some examples, the cluster resource manager 112 is a "daemon" program and an instance of the manager 112 is run on each host device in the system. The cluster resource manager 112 is configured to send instructions to the data store cluster 106 with respect to resync operations to be performed. Managing the performance of the resync operations 116-118 also includes obtaining the resync I/O bandwidth limit 126 from the data store cluster 106 in order to determine the capacity of the cluster 106 for handling new resync operations.

The resync operation queue 114 of the cluster resource manager 112 includes hardware, firmware, and/or software configured to temporarily store the resync operations 116-118 that are to be performed and/or data associated with the resync operations 116-118. The resync operations 116-118 may be stored in the queue 114 until they are initiated and/or performed on the cluster 106, at which point the cluster resource manager 112 removes the initiated resync operations from the queue 114. In some examples, the queue 114 is a "first in, first out" (FIFO) structure, such that, as requested or proposed resync operations arrive at the cluster resource manager 112, they are added to the "back" of the queue 114 and when the cluster resource manager 112 accesses a resync operation 116 from the queue 114 to determine whether to initiate it, the manager 112 accesses the operation 116 from the "front" of the queue 114, such that the operation that has been in the queue 114 the longest is the next operation to be accessed. Alternatively, the queue 114 may be configured to operate according to other data structure principles without departing from the description herein.

The resync operations 116-118 are operations that are automatically generated by the host device 102 for management of the data stored in the data store cluster 106 that is associated with hosted guest systems and/or other applications of the host device 102. The resync operations 116-118 are configured to resynchronize data in the distributed data stores 108-110, which may include copying data from one data location to another and then releasing the storage space at the original data location. These operations may be performed for a variety of purposes, including to repair errors in the data cluster 106, to make space in particular data locations to enable maintenance tasks, to rebalance the way data is stored within the cluster 106 and/or within particular distributed data stores 108-110, and/or to account for changes to configuration settings of the cluster 106. Resync operations may also be generated and/or initiated due to other events in the system 100 without departing from the description herein.

Each resync operation 116-118 includes data indicating how the resync operation is to be performed, including current data location or locations, a location or locations to which the data is to be moved, and a resync capacity value 120, which indicates the amount of data storage space that is occupied by the data to be moved. For instance, if the size of the data file or structure to be moved is 10 megabytes (MB), the resync capacity value 120 of the resync operation 116 is set to 20 MB, representing that, during the operation 116, the moved data is copied to the new location first, such that 20 MB will be occupied. It should be understood that the resync capacity value 120 indicates the maximum amount of storage space occupied and that, after the process is complete, data storage space at the original location may be freed to be used, such that the data associated with the operation once again only occupies 10 MB.

The resync limit 122 is configured to limit the number and/or size of resync operations that may be initiated by the cluster resource manager 112. In some examples, the resync limit 122 is set to the same ratio or fraction as the resync I/O bandwidth limit 126 of the data store cluster 106 as described herein. Alternatively, the resync limit 122 may be set to other values or otherwise defined without departing from the description herein.

The transient capacity value 124 of the cluster resource manager 112 is a value that indicates an amount of data storage space that is temporarily occupied by resync operations that are currently being performed. The cluster resource manager of each host device in the system maintains an up-to-date transient capacity value 124 as resync operations are initiated and completed, adding the resync capacity value 120 of the operation to the transient capacity value 124 upon initiation and subtracting the resync capacity value 120 from the transient capacity value 124 when the operation is completed and the original data storage space from which the data was copied has been released or otherwise freed. The cluster resource manager 112 is further configured to request or otherwise obtain the transient capacity values of other host devices in the system 100 in order to calculate a current total transient capacity value for the entire system. The total transient capacity value is used to determine whether to initiate a resync operation as described herein.

In some examples, in order to determine whether a resync operation 116-118 in the queue 114 will be initiated and/or performed on the cluster 106, the cluster resource manager 112 is configured to obtain the resync I/O bandwidth limit 126, obtain current transient capacity values from other host devices 104, and obtain or otherwise determine an available capacity value of the data store cluster 106 and the associated distributed data stores 108-110 that indicates how much data storage space thereon is currently free for use. The cluster resource manager 112 is further configured to set the local resync limit 122 based on the obtained resync I/O bandwidth limit 126 (e.g., setting the resync limit 122 to the same ratio or percentage value as the resync I/O bandwidth limit 126).

Because the rate at which free data storage space on the cluster 106 is consumed is dependent on the relative amounts of I/O bandwidth that can be used to write to claim and write to the free data storage space to consume it, it should be understood that setting the resync limit 122 of the cluster resource manager 112 equal to the resync I/O bandwidth limit 126 establishes a limit that prevents the cluster resource manager 112 from initiating resync operations on the cluster 106 that would consume free data storage space in such a way that inhibits the performance of user-facing applications or other applications on the system 100. For instance, when the limit 126 and, thus, the limit 122 are set to 20% maximum capacity for resync operations, the resync operations are enabled to use only 20% of the total I/O bandwidth to write to free space in the cluster 106, while other applications are enabled to use 80% of the total I/O bandwidth, such that the other applications may consume free space in the cluster at four times the rate that the resync operations use the free space. Thus, by limiting the free space capacity consumption to the same 20% ratio for determining whether initiate resync operations, the cluster resource manager 112 or other cluster resource managers associated with other host devices in the system 100 are configured to initiate resync operations at a rate that ensures that space occupied temporarily during resync operations does not interfere with the performance of other applications on the system.

In some examples, the cluster resource manager 112 is configured to determine whether to initiate the next resync operation 116 in the queue 114 by comparing a sum of the resync capacity value of the resync operation 116 and the total transient capacity value of the cluster 106 (an amount of data storage space temporarily occupied by resync operations and/or other background operations) to a product of the total available capacity value of the cluster and the resync limit. Alternatively stated, the cluster resource 112 compares the ratio of the transient capacity of the cluster 106 to the current available capacity of the cluster 106 to the resync limit 122, which is based on the resync I/O bandwidth limit 126. If the transient capacity of the cluster 106, including the resync capacity value 120 of the resync operation 116 to be initiated (e.g., the sum of values described above), is a fraction of the current available capacity value that is less than or equal to the resync limit 122, the current host manager 112 is configured to initiated the resync operation 116 on the data store cluster 106. Alternatively, if the resync operation 116 to be initiated would not fit within the resync limit 122, the cluster resource manager 112 may be configured to delay the initiation of the resync operation 116 and/or otherwise handle the operation 116 as described herein. An example comparison for determining whether to initiate a resync operation is as follows:

$$(\text{resync capacity value} + \text{total transient capacity value})$$
$$<= \text{resync limit} * \text{total available capacity value}$$

In the above equation, the resync capacity value is the resync capacity value of the resync operation to be initiated, the total transient capacity value is the sum of the transient capacity values of all host devices in the system 100, and the total available capacity value is the total free data storage space in the cluster 106.

In alternative examples, the data values may be combined in other ways to determine whether to initiate a resync operation without departing from the description herein.

Figure 2:
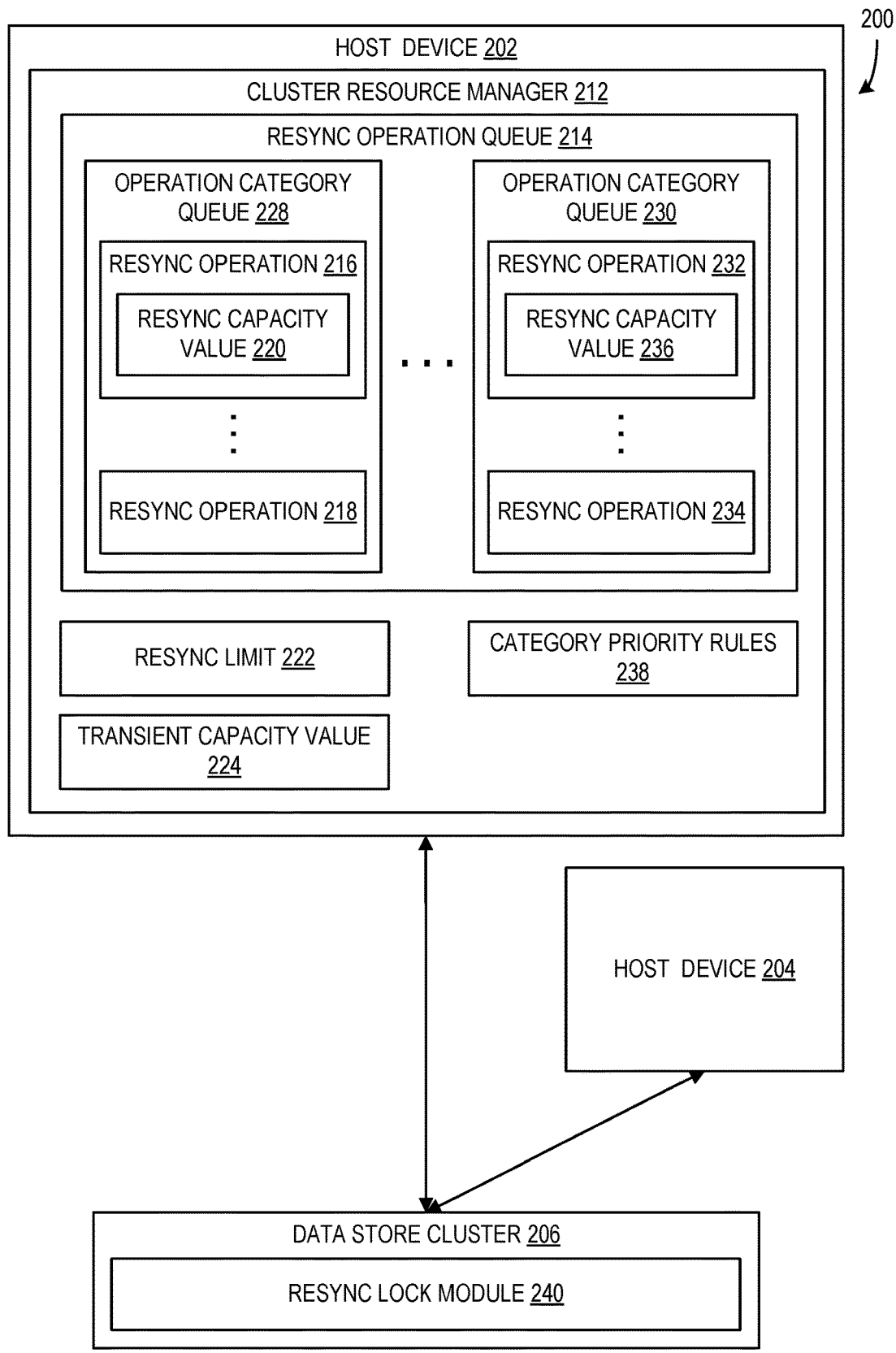
FIG. 2 is a block diagram illustrating a system configured for throttling data storage usage by resynchronization operations in a cluster of distributed data stores based on operation categories according to an embodiment.

FIG. 2 is an exemplary block diagram illustrating a system 200 configured for throttling data storage usage by resynchronization operations in a cluster of distributed data stores based on operation categories according to an embodiment. It should be understood that, in some examples, the system 200 is configured to operate in a substantially similar way to the system 100 of FIG. 1 described above. Further the system 200 includes a resync operation queue 214 of the cluster resource manager 212 that includes multiple operation category queues 228-230, category priority rules 238 that are used by the cluster resource manager 212 to determine from which operation category queue 228-230 to access a next resync operation, and a resync lock module 240 of the data store cluster 206 that is configured to be locked by a single host device prior to the host device initiating and/or performing a resync operation.

As described above with respect to the resync operation queue 114, the resync operation queue 214 is configured to receive and temporarily store resync operations that are to be performed and associated data. Further, the resync operation queue 214 includes a plurality of operation category queues 228-230 that store resync operations of various different categories, enabling the cluster resource manager 212 to handle different categories or types of resync operations in different ways according to the defined category priority rules 238. In some examples, each type of resync operation is sorted into a separate operation category queue 228-230 upon being received by the cluster resource manager 212. For instance, the operation category queues 228-230 may include a queue for a repair category, a queue for a maintenance category, a queue for a resource balancing category, and/or a queue for a configuration category. Alternatively, or additionally, category queues 228-230 may include queues for resync operations that have been newly queued and queues for resync operations that have been delayed based on the resync limit 222 as described herein and/or queues for different size categories of resync operations (e.g., resync operations that are directed at moving different amounts of data between memory locations). Further categories or types of resync operations may be sorted between different queues of the operation category queues 228-230 without departing from the description herein.

The cluster resource manager 212 is configured to sort proposed resync operations it receives between the available operation category queues 228-230 of the resync operation queue 214. In some examples, a proposed resync operation includes a specific category metadata value that indicates a category of the operation and the cluster resource manager 212 is configured to assign the proposed resync operation to a category queue of the operation category queues 228-230 that matches the category metadata value. Alternatively, or additionally, other metadata values, such as the resync capacity value (e.g., resync capacity value 220 and/or 236) of the resync operation, may be used by the cluster resource manager 212 to categorize the proposed resync operations (e.g., the resync capacity size may be used to categorize resync operations into different size category queues). Further, the cluster resource manager 212 may be configured to identify patterns and/or combinations of data and metadata of a proposed resync operation in order to sort it and assign it to a matching operation category queue 228-230. For instance, a proposed resync operation includes a source metadata indicator that indicates the operation was generated for resource balancing and the cluster resource manager 212 identifies the indicator and assigns the proposed resync operation to an operation category queue associated with resource balancing operations.

The cluster resource manager 212 is further configured to access resync operations (e.g., resync operations 216-218 and 232-234) from the multiple operation category queues 228-230 based on defined category priority rules 238. The category priority rules 238 are configured to indicate an order in which resync operations are accessed from the category queues 228-230 and/or to inform other behaviors of the cluster resource manager 212 based on the categories of resync operations when the cluster resource manager 212 determines whether to initiate resync operations. For example, the operation category queues 228-230 include categories for different types of resync operations, as mentioned above, including repair-based operations which may be urgent for maintaining the stability of the system, maintenance-based operations which may be less urgent and/or a result of periodically scheduled maintenance plans, configuration-based operations which may be the result of changes to configuration or settings of the cluster 206 or other part of the system 200, and resource balancing-based operations which may be the result of defined resource-balancing plans of the cluster 206. The category priority rules 238 include a priority order for when to access resync operations form each category queue 228-230 such that repair-based operations are accessed and initiated first. If there are no repair-based operations, then the maintenance-based operations are accessed and initiated, and then the configuration-based operations. If none of those types of operations are queued, the resource balancing-based operations are accessed and initiated.

In some examples, the category priority rules 238 include the rules described above with respect to the different types of operations, but the rules 238 further include a rule that if a resync operation has been queued for longer than a defined queue time threshold (e.g., 10 minutes, 30 minutes, 1 hour), that operation is considered the highest priority operation, regardless of type. Alternatively, category priority rules 238 may be configured to instruct the cluster resource manager 212 to identify a next highest priority queued resync operation that fits within the resync limit upon the highest priority queued resync operation being delayed due to the resync limit.

In other examples, the category priority rules 238 are configured to cause each category of queued resync operation to use a defined fraction or percentage of the available resources. For instance, a high-priority category is assigned a percentage of 70%, while a low-priority category is assigned a percentage of 30%. So, the cluster resource manager 212 is configured by these rules 238 to select resync operations from the high-priority category queue 70% of the time and from the low-priority category queue 30% of them (e.g., for every ten resync operations processed, the cluster resource manager 212 selects seven high-priority resync operations and three low-priority resync operations).

Many other arrangements of category priority rules 238 may be used define the functionality of the cluster resource manager 212 in determining when to initiate resync operations from various operation category queues 228-230 without departing from the description herein.

It should be understood that, after selecting or otherwise accessing a queued resync operation from one of the operation category queues 228-230 based on the category priority rules 238, the cluster resource manager 212 is configured to determine whether to initiate the selected resync operation in the same manner as described above with respect to the cluster resource manager 112 of FIG. 1.

The data store cluster 206 further includes a resync lock module 240 that is configured to prevent multiple host devices 202-204 from initiating resync operations on the data store cluster 206 simultaneously. The resync lock module 240 is configured to operate according mutual exclusion principles. In some examples, the resync lock module 240 includes application program interfaces (APIs) or other interfaces that host devices and associated cluster resource managers use to "lock" and/or "release" the module 240. When a host device attempts to lock the module 240 and no other host device currently has it locked, the host device successfully locks the module 240 and is able to initiate a resync operation. Alternatively, when a host device attempts to lock the module 240 and another host device has it locked, host device may receive a failure message indicating that the module 240 is not currently available to be locked. In further examples, host devices that attempt to lock the module 240 when it is already locked may be added to a lock queue, such that when the module 240 becomes available, the queued host device or devices receive access to the module 240 in the order in which they requested to lock the module 240. It should be understood that other mutual exclusion techniques and/or arrangements may be implemented with respect to the resync lock module 240 of the data store cluster 206 without departing from the description herein.

Figure 3:
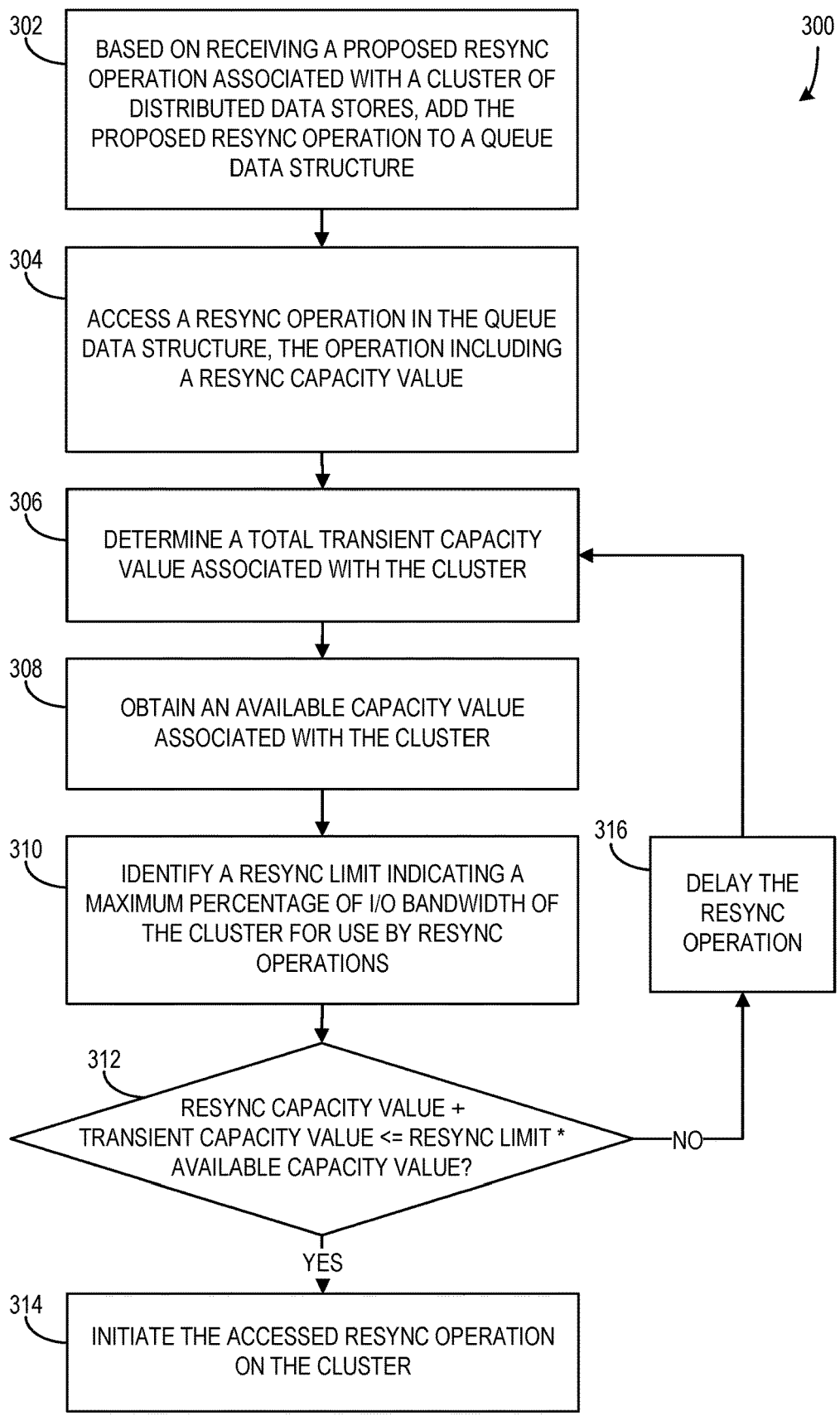
FIG. 3 is a flow chart illustrating a method of throttling data storage usage by resynchronization operations in a cluster of distributed data stores based on I/O bandwidth limits according to an embodiment.

FIG. 3 is an exemplary flow chart illustrating a method 300 of throttling data storage usage by resynchronization operations in a cluster of distributed data stores based on I/O bandwidth limits according to an embodiment. In some examples, the method 300 is implemented on and/or executed by a system such as system 100 of FIG. 1 or system 200 of FIG. 2. Further, the operations of the method 300 may be performed by one or more components of the system, such as the cluster resource managers 112 and 212.

At 302, based on receiving a proposed resync operation associated with a cluster of distributed data stores, the proposed resync operation is added to a queue data structure (e.g., resync operation queues 114 and/or 214). In some examples, the proposed resync operation is received by a cluster resource manager of a host device from a different component or application on the host device, such as a guest system being executed on the host device or the like. Alternatively, or additionally, the proposed resync operation may be received by the cluster resource manager in response to an event occurring on the host device, such as detection of a data storage error that must be repaired or the initiation of a scheduled resync operation for maintenance purposes.

At 304, a resync operation in the queue data structure is accessed. The accessed resync operation includes a resync capacity value that indicates the amount of data storage space that will be temporarily used during the performance of the resync operation. It should be understood that, while operations 302 and 304 are illustrated as being performed in order, in other examples, the receiving and adding of proposed resync operations to the queue data structure and the accessing of resync operations in the queue data structure may happen in a different order and/or substantially simultaneously or in parallel (e.g., a resync operation is accessed from the front of the queue data structure while another resync operation is added to the back of the queue data structure).

In some examples, accessing the resync operation in the queue data structure includes adding the resync capacity value of the resync operation to the transient capacity value of the associated cluster resource manager, which "reserves" a portion of the transient capacity value for the accessed resync operation, even if the resync operation is delayed. As a result, the transient capacity value of the cluster resource manager is increased to reflect the resync capacity value of the accessed resync operation until the operation has been completed. Alternatively, the transient capacity value of the cluster resource manager may not be changed to include the resync capacity value of the resync operation until the resync operation is initiated as described herein.

At 306, the total transient capacity value associated with the cluster is determined. The transient capacity values of each other host device that is associated with the cluster are requested and, upon receiving the transient capacity values, they are summed with the transient capacity value of the host device on which the method 300 is being executed. In some examples, each host device tracks a local transient capacity value by increasing the value based on the initiation of resync operations and/or other similar background operations and by decreasing the value based on the completion of initiated resync operations and/or other similar background operations.

At 308, an available capacity value associated with the cluster is obtained. The available capacity value indicates the total amount of data storage space that is available for use by applications of the host devices of the system. The available capacity may include the total free space of the distributed data stores and/or the space that is considered transient capacity that is temporarily in use by resync operations and/or other similar background processes. In some examples, the cluster or an associated component tracks the available capacity of the cluster and/or the used or occupied capacity of the cluster. Further, the total capacity of the cluster is also available to the cluster, so subtraction of the occupied capacity of the cluster from the total capacity of the cluster may be used to determine the available capacity value. The host device that is executing method 300 may request the available capacity value from the cluster. Alternatively, or additionally, the host device may obtain other cluster capacity metadata, such as the total capacity and used capacity values of the cluster, and derive or calculate the available capacity value therefrom.

At 310, a resync limit (e.g., resync I/O bandwidth limit 126) that indicates a maximum percentage or ratio of I/O bandwidth of the cluster for use by resync operations is identified. In some examples, the resync limit of the cluster is set in the configuration and/or settings of the cluster and the host device executing the method 300 requests or otherwise obtains the resync limit from the cluster.

At 312, if the sum of the resync capacity value and the transient capacity value is less than or equal to the product of the resync limit and the available capacity value, the process proceeds to initiate the accessed resync operation on the cluster at 314. Alternatively, if the sum of the resync capacity value and the transient capacity value is greater than the product of the resync limit and the available capacity value, the process proceeds to delay the initiation of the resync operation at 316. In alternative examples, the comparison of the resync capacity value of the accessed resync operation to the available capacity value of the cluster may be calculated and/or performed in other ways without departing from the description herein. For instance, rather than a percentage or ratio, the resync limit is defined as a flat data storage amount value (e.g., 10 gigabytes (GB)) and sum of the resync capacity value and the total transient capacity value is compared directly to the resync limit (e.g., if the sum of the resync capacity value and the total transient capacity value is less than or equal to 10 GB, the resync operation is initiated as described herein).

At 314, the accessed resync operation is initiated on the cluster. In some examples, initiating the resync operation on the cluster includes sending the resync operation data from the host device to the cluster for execution and/or sending instructions for performing the resync operation from the host device to the cluster for execution. Further, the transient capacity value of the host device may be increased based on the resync capacity value of the initiated resync operation if it has not already been increased previously in the process. As described herein, after initiation of the resync operation, data that is stored in a first location or set of locations within the cluster of distributed data stores is copied to a second location or set of locations and, upon completion of the copying, the first location or set of locations are released or freed for use by another application or operation. Further, initiation of the resync operation results in the resync operation being removed from the queue data structure such that the method 300 may be performed again by accessing another resync operation from the queue data structure.

Alternatively, at 316, the resync operation is delayed when the resync capacity value of the resync operation does not "fit" within the defined resync limit as described herein. In some examples, delaying the resync operation includes leaving the resync operation in the queue data structure and returning to 306 of the method 300 to perform the resync limit check at 312 again with up-to-date data values obtained from 306-310. Delaying the resync operation may further include a delay time period during which the method 300 does not proceed (e.g., after a resync operation is found to not fit within the resync limit at 312, the process waits for 2 seconds before obtaining up-to-date data values at 306-310 again). Such a delay may be defined for a length of time that prevents the process from repeatedly performing checks when changes have not occurred in the available capacity and/or total transient capacity of the cluster but also ensures that the resync operations are performed in a timely manner.

In further examples, delaying the resync operation at 316 includes analysis of other resync operations in the queue data structure to identify the next resync operation therein that has a resync capacity value that fits within the resync limit. The identified resync operation may then be initiated, such that the delayed resync operation does not prevent other "smaller" resync operations from proceeding. However, bypassing a delayed resync operation may be limited by the number of times it can be bypassed and/or an amount of time that it has been delayed to prevent a delayed resync operation from being perpetually bypassed by smaller or faster resync operations.

Figure 4:
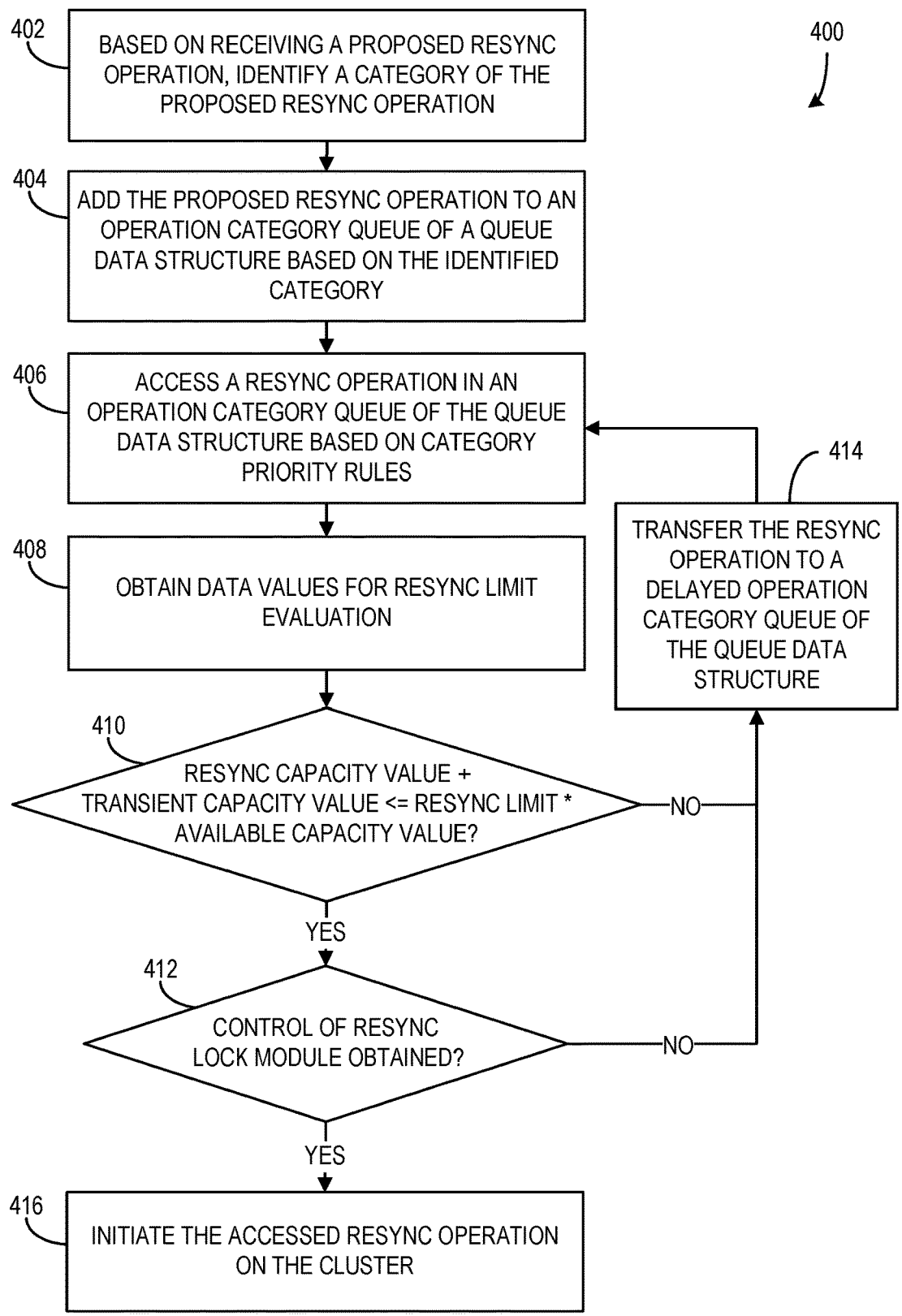
FIG. 4 is a flow chart illustrating a method of throttling data storage usage by resynchronization operations based on categories of the operations according to an embodiment.

FIG. 4 is a flow chart illustrating a method 400 of throttling data storage usage by resynchronization operations based on categories of the operations according to an embodiment. In some examples, the method 400 is implemented on and/or executed by a system such as system 100 of FIG. 1 or system 200 of FIG. 2. Further, the operations of the method 400 may be performed by one or more components of the system, such as the cluster resource managers 112 and 212.

At 402, based on receiving a proposed resync operation, a category of the proposed resync operation is identified. In some examples, identifying the category of the resync operation is based on identifying metadata in the data of the resync operation, such as category indication metadata. Alternatively, or additionally, identifying the category of the resync operation may be based on a source of the resync operation, such as the specific application or other component from which the resync operation is received or a type of application or component from which the resync operation is received. In further examples, identifying a category of the proposed resync operation includes classifying the resync operation by comparing metadata or other data associated with the operation to one or more defined category data patterns. As a result, determining a category for a resync operation may be based one a combination of metadata or other data values matching or being substantially similar to a defined set of data values in a defined category data pattern (e.g., a resync operation is classified in a category when it is received within a defined time period from a particular source and the resync operation has a resync capacity value that is within a defined range).

At 404, the proposed resync operation is added to an operation category queue of the queue data structure based on the category identified at 402. In some examples, the queue data structure includes operation category queues that are used to divide the received resync operation by type (e.g., repair-based operations, maintenance-based operations, resource balancing-based operations, and/or configuration-based operations). Alternatively, or additionally, more, fewer, or different category queues may be used in the queue data structure without departing from the description herein. For instance, resync operations that have been delayed due to the resync limit as described herein may be transferred to an operation category queue or queues associated specifically with delayed resync operations as opposed to "new" resync operations (e.g., operations that have been queued but not accessed for the first time yet).

At 406, a resync operation is accessed in an operation category queue of the queue data structure based on category priority rules. In some examples, the category priority rules are defined such that, upon evaluation, a particular operation category queue of the queue data structure is selected and the first, or oldest, resync operation in the selected operation category queue is accessed. The category priority rules may indicate a priority order of the operation category queues (e.g., repair-based operations are always selected if any are queued, then maintenance-based operations are selected if no repair-based operations are queued, etc.). Alternatively, or additionally, the category priority rules may be defined to evaluate the proportion of recently selected operation category queues to determine the next selected operation category queue. For instance, the category priority rules are defined to cause three high-priority resync operations to be initiated for every one low-priority resync operation when there are operations queued in both the high-priority queue and the low priority queue. When the last three initiated resync operations were from the high-priority category queue, the next resync operation is accessed from the low-priority category queue if there is a resync operation queued therein.

At 408, data values for resync limit evaluation are obtained. It should be understood that obtaining the data values for resync limit evaluation includes determining the total transient capacity value associated with the cluster, obtaining an available capacity value associated with the cluster, and identifying the resync limit of the cluster as described above with respect to 306-310 of FIG. 3. Further, obtaining the data values for the resync limit evaluation includes accessing the resync capacity value of the accessed resync operation for use in the resync limit evaluation if it has otherwise not been done.

At 410, the resync limit evaluation is performed. If the sum of the resync capacity value and the transient capacity value is less than or equal to the product of the resync limit and the available capacity value, the process proceeds to 412. Alternatively, if the sum of the resync capacity value and the transient capacity value is greater than the product of the resync limit and the available capacity value, the process proceeds to 414.

At 412, the host device performing the method 400 seeks control of a resync lock module of the cluster and, if control of the resync lock module is obtained, the host device proceeds to 416 to initiate the accessed resync operation on the cluster as described above with respect to 314 of FIG. 3. Alternatively, if the host device is unable to obtain control of the resync lock module, the process proceeds to 414. In some examples, obtaining control the resync lock module includes requesting control of the resync lock module from the cluster via a defined API and receiving a response that indicates whether control has been obtained or not. As described above, the resync lock module can only be controlled by one host device or associated application at a time, and if another host device controls the resync lock module, the attempt to obtain control fails. However, it should be understood that, in alternative examples, the resync lock module may be configured to enable multiple host devices to control it at once or other locking arrangement without departing from the description herein.

At 414, the resync capacity value of the accessed resync operation does not fit within the defined resync limit based on the evaluation at 410 or control of the resync lock module was not obtained at 412 and, as a result, the accessed resync operation is transferred to a delayed operation category queue of the queue data structure. After the delayed resync operation is transferred to the delayed operation category queue, the process returns to 406 to access a resync operation based on category priority rules as described above. In some examples, the category priority rules are defined such that delayed resync operations are accessed at a high priority and/or frequency relative to other operation categories.

Additional Example Scenarios

Aspects of the disclosure enable various additional scenarios, such as next described.

In an example, a cluster of distributed data stores is in use by multiple host devices. The host devices are executing guest systems, including virtual machines, and those guest systems are using the cluster of distributed data stores for storage of data. Each host device includes a cluster resource manager that is configured to queue and initiate resynchronization operations ("resync operations") to maintain the storage and distribution of data associated with the host devices and guest systems on the cluster.

A cluster resource manager receives a resync operation generated by for rebalancing the distribution of data in the cluster. The cluster resource manager identifies that the resync operation is for resource balancing based on a type metadata value on the resync operation and adds the resync operation to an operation category queue associated with resource balancing of a multi-queue data structure.

Further cluster resource manager evaluates a set of category priority rules to determine which resync operation to next attempt to initiate. The category priority rules indicate that, if there is a resync operation in the operation category queue associated with repair-based operations, the first resync operation from that queue should be selected. The cluster resource manager determines that there is a repair-based resync operation in the queue and accesses the first queued resync operation in that queue. The resync capacity value of the resync operation is also accessed for use in evaluating the current resync limit.

The cluster resource manager requests the transient capacity values from each other host device that is using the cluster of data stores and, upon receiving the transient capacity values from the other host devices, the manager adds its own transient capacity value to the received values to determine a current total transient capacity value associated with the cluster. The cluster resource manager also requests and receives the current available capacity value and the resync I/O bandwidth limit of the cluster.

The cluster resource manager then evaluates whether to initiate the accessed resync operation based on a comparison of the various gathered data values. The manager adds the resync capacity value to the total transient capacity value to determine the total transient capacity value if the resync operation being evaluated is initiated. The manager also multiplies the current available capacity value by the resync I/O bandwidth limit of the cluster to determine a current allowable value for the total transient capacity value based on the current available capacity value. The manager determines that the calculated total transient capacity value is less than the calculated current allowable value, indicating that the accessed resync operation will fit within the defined limit. As a result, the cluster resource manager initiates the accessed resync operation on the cluster and removes it from the associated operation category queue.

In another example, the cluster resource manager determines that the next resync operation to evaluate is the first resync operation in the resource balancing category queue. The cluster resource manager gathers the required data values and evaluates the resync operation with respect to the defined resync limit as described herein. The manager determines that the resync operation cannot be initiated yet, based on the resync limit. The cluster resource manager delays the resync operation by moving it to a high-priority delayed operation category queue and, later, when some of the other current resync operations are completed, sufficient space is freed within the resync limit to initiated the delayed resync operation as described herein.

Exemplary Operating Environment

Figure 5:
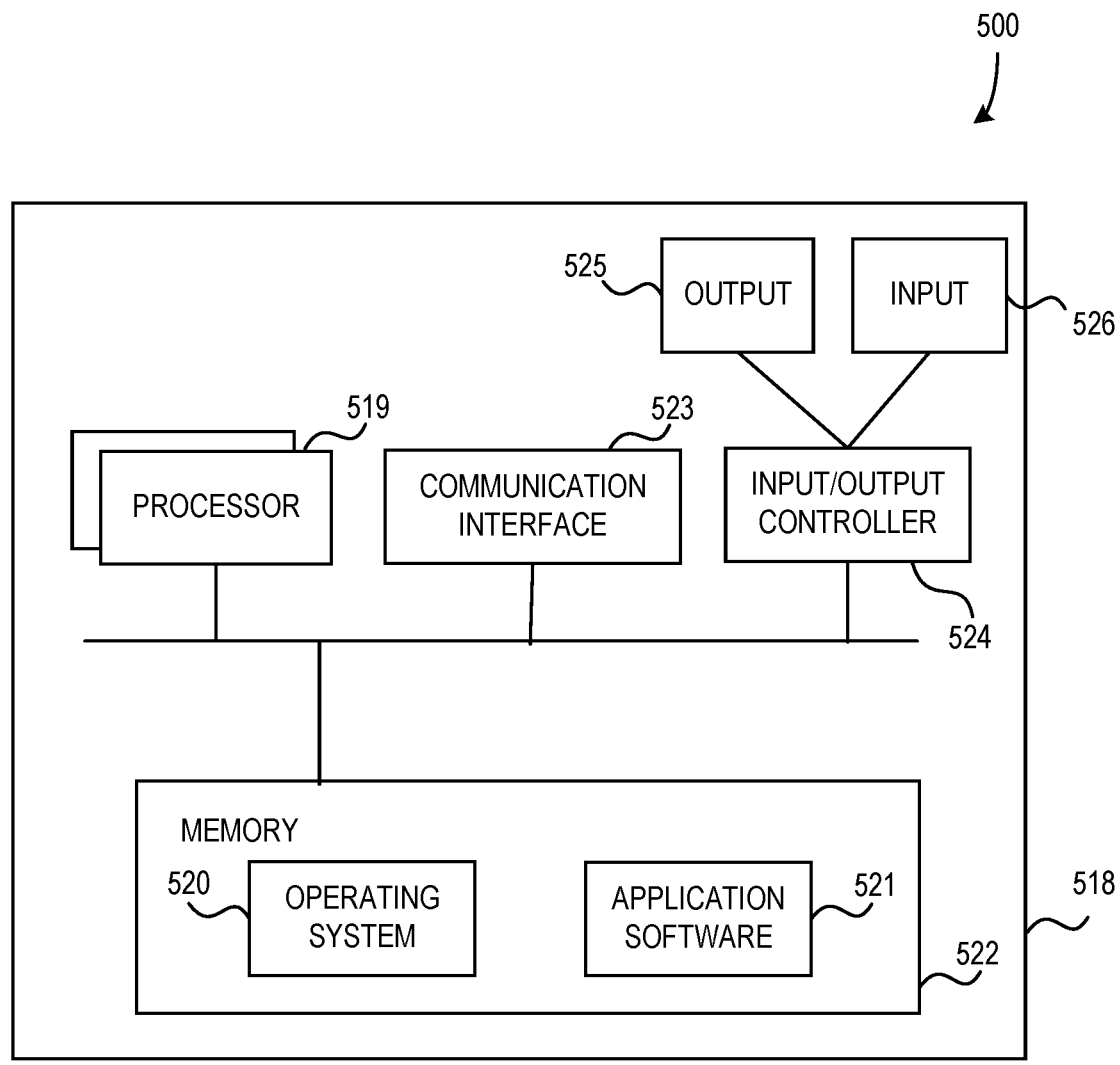
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, throttling the data storage capacity usage of resynchronization operations in a data store cluster based on I/O bandwidth limits as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor of a computing device of a user; and at least one memory comprising computer program code, the at least one memory and the computer program code configured to, with the at least one processor, cause the at least one processor to: based on receiving a proposed resynchronization operation associated with the cluster, add, by a cluster resource manager, the proposed resynchronization operation to a queue data structure; access, by the cluster resource manager, a resynchronization operation in the queue data structure, the accessed resynchronization operation including a resynchronization capacity value indicating an amount of data storage space of the cluster to be used during performance of the accessed resynchronization operation; determine, by the cluster resource manager, a total transient capacity value indicating an amount of data storage space of the cluster that is used by resynchronization operations; obtain, by the cluster resource manager, an available capacity value indicating an amount of data storage space of the cluster that is available for use; identify, by the cluster resource manager, a resynchronization limit of the cluster, wherein the resynchronization limit indicates a maximum percentage of I/O bandwidth of the cluster that is for use by resynchronization operations; based on a sum of the resynchronization capacity value and the transient capacity value being less than or equal to a product of the resynchronization limit and the available capacity value, initiate, by the cluster resource manager, the accessed resynchronization operation on the cluster, whereby free space is maintained in the cluster for use by user operations.

A computerized method for throttling data storage usage by resynchronization operations in a cluster of distributed data stores based on input/output (I/O) bandwidth limits comprises: based on receiving a proposed resynchronization operation associated with the cluster, adding, by a cluster resource manager, the proposed resynchronization operation to a queue data structure; accessing, by the cluster resource manager, a resynchronization operation in the queue data structure, the accessed resynchronization operation including a resynchronization capacity value indicating an amount of data storage space of the cluster to be used during performance of the accessed resynchronization operation; determining, by the cluster resource manager, a total transient capacity value indicating an amount of data storage space of the cluster that is used by resynchronization operations; obtaining, by the cluster resource manager, an available capacity value indicating an amount of data storage space of the cluster that is available for use; identifying, by the cluster resource manager, a resynchronization limit of the cluster, wherein the resynchronization limit indicates a maximum percentage of input/output (I/O) bandwidth of the cluster that is for use by resynchronization operations; based on a sum of the resynchronization capacity value and the transient capacity value being less than or equal to a product of the resynchronization limit and the available capacity value, initiating, by the cluster resource manager, the accessed resynchronization operation on the cluster, whereby free space is maintained in the cluster for use by user operations.

One or more non-transitory computer readable storage media having computer-executable instructions for throttling data storage usage by resynchronization operations in a cluster of distributed data stores based on input/output (I/O) bandwidth limits that, upon execution by a processor, cause the processor to at least: based on receiving a proposed resynchronization operation associated with the cluster, add, by a cluster resource manager, the proposed resynchronization operation to a queue data structure; access, by the cluster resource manager, a resynchronization operation in the queue data structure, the accessed resynchronization operation including a resynchronization capacity value indicating an amount of data storage space of the cluster to be used during performance of the accessed resynchronization operation; determine, by the cluster resource manager, a total transient capacity value indicating an amount of data storage space of the cluster that is used by resynchronization operations; obtain, by the cluster resource manager, an available capacity value indicating an amount of data storage space of the cluster that is available for use; identify, by the cluster resource manager, a resynchronization limit of the cluster, wherein the resynchronization limit indicates a maximum percentage of I/O bandwidth of the cluster that is for use by resynchronization operations; based on a sum of the resynchronization capacity value and the transient capacity value being less than or equal to a product of the resynchronization limit and the available capacity value, initiate, by the cluster resource manager, the accessed resynchronization operation on the cluster, whereby free space is maintained in the cluster for use by user operations.

Alternatively, or in addition to the other examples described herein, examples include any combination of the following:

further comprising: based on the sum of the resynchronization capacity value and the transient capacity value being greater than the product of the resynchronization limit and the available capacity value, delaying, by the cluster resource manager, the accessed resynchronization operation; based on delaying the accessed resynchronization operation, periodically determining, by the cluster resource manager, the total transient capacity value and the available capacity; and based on the sum of the resynchronization capacity value and the transient capacity value being less than or equal to the product of the resynchronization limit and the available capacity value, initiating the delayed resynchronization operation.

wherein delaying the accessed resynchronization operation includes moving the accessed resynchronization operation from a new operation queue of the queue data structure to a delayed operation queue of the queue data structure; and wherein accessing the resynchronization operation in the queue data structure includes prioritizing resynchronization operations in the delayed operation queue at a higher priority than resynchronization operations in the new operation queue.

further comprising: based on delaying the accessed resynchronization operation, identifying, by the cluster resource manager, a next resynchronization operation in the queue data structure, wherein a sum of a next resynchronization capacity value of the next resynchronization operation and the total transient capacity value is less than or equal to the product of the available capacity value and the resynchronization limit; and initiating, by the cluster resource manager, the identified next resynchronization operation.

wherein the queue data structure includes a plurality of operation category queues, each operation category queue being associated with a defined operation category; wherein adding the proposed resynchronization operation to the queue data structure includes identifying an operation category of the proposed resynchronization operation and adding the proposed resynchronization operation to the operation category queue of the queue data structure that is associated with the identified operation category; and wherein accessing the resynchronization operation from the queue data structure includes accessing the resynchronization operation from an operation category queue of the plurality of operation category queues based on at least one operation category priority rule.

wherein the plurality of operation category queues includes at least one of an operation category queue for a repair category, an operation category queue for a maintenance category, an operation category queue for a resource balancing category, or an operation category queue for a configuration category.

wherein initiating the accessed resynchronization operation on the cluster is further based on the cluster resource manager obtaining control of a shared resynchronization lock module associated with the cluster; and further comprising the cluster resource manager releasing control of the shared resynchronization lock module based on completion of the initiated resynchronization operation, whereby the shared resynchronization lock module is made available for control by other entities.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for adding, by a cluster resource manager, a proposed resynchronization operation to a queue data structure based on receiving the resynchronization operation associated with the cluster; exemplary means for accessing, by the cluster resource manager, a resynchronization operation in the queue data structure, the accessed resynchronization operation including a resynchronization capacity value indicating an amount of data storage space of the cluster to be used during performance of the accessed resynchronization operation; exemplary means for determining, by the cluster resource manager, a total transient capacity value indicating an amount of data storage space of the cluster that is used by resynchronization operations; exemplary means for obtaining, by the cluster resource manager, an available capacity value indicating an amount of data storage space of the cluster that is available for use; exemplary means for identifying, by the cluster resource manager, a resynchronization limit of the cluster, wherein the resynchronization limit indicates a maximum percentage of input/output (I/O) bandwidth of the cluster that is for use by resynchronization operations; and based on a sum of the resynchronization capacity value and the transient capacity value being less than or equal to a product of the resynchronization limit and the available capacity value, exemplary means for initiating, by the cluster resource manager, the accessed resynchronization operation on the cluster, whereby free space is maintained in the cluster for use by user operations.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for throttling resynchronization operations in a cluster of distributed data stores based on input/output (I/O) bandwidth limits, the system comprising:
    at least one processor of a computing device of a user; and
    at least one memory comprising computer program code, the at least one memory and the computer program code configured to, with the at least one processor, cause the at least one processor to:
    based on receiving a proposed resynchronization operation associated with the cluster, add, by a cluster resource manager, the proposed resynchronization operation to a queue data structure;
    access, by the cluster resource manager, a resynchronization operation in the queue data structure, the accessed resynchronization operation including a resynchronization capacity value indicating an amount of data storage space of the cluster to be used during performance of the accessed resynchronization operation;
    determine, by the cluster resource manager, a total transient capacity value indicating an amount of data storage space of the cluster that is used by resynchronization operations;
    obtain, by the cluster resource manager, an available capacity value indicating an amount of data storage space of the cluster that is available for use;
    identify, by the cluster resource manager, a resynchronization limit of the cluster, wherein the resynchronization limit indicates a maximum percentage of I/O bandwidth of the cluster that is for use by resynchronization operations;
    based on a sum of the resynchronization capacity value and the total transient capacity value being less than or equal to a product of the resynchronization limit and the available capacity value, initiate, by the cluster resource manager, the accessed resynchronization operation on the cluster, whereby free space is maintained in the cluster for use by user operations.

2. The system of claim 1, wherein the at least one memory and the computer program code configured is to, with the at least one processor, further cause the at least one processor to:
based on the sum of the resynchronization capacity value and the transient capacity value being greater than the product of the resynchronization limit and the available capacity value, delay, by the cluster resource manager, the accessed resynchronization operation;
based on delaying the accessed resynchronization operation, periodically determine, by the cluster resource manager, the total transient capacity value and the available capacity; and
based on the sum of the resynchronization capacity value and the transient capacity value being less than or equal to the product of the resynchronization limit and the available capacity value, initiate the delayed resynchronization operation.

3. The system of claim 2, wherein delaying the accessed resynchronization operation includes moving the accessed resynchronization operation from a new operation queue of the queue data structure to a delayed operation queue of the queue data structure; and
wherein accessing the resynchronization operation in the queue data structure includes prioritizing resynchronization operations in the delayed operation queue at a higher priority than resynchronization operations in the new operation queue.

4. The system of claim 2, wherein the at least one memory and the computer program code configured is to, with the at least one processor, further cause the at least one processor to:
based on delaying the accessed resynchronization operation, identify, by the cluster resource manager, a next resynchronization operation in the queue data structure, wherein a sum of a next resynchronization capacity value of the next resynchronization operation and the total transient capacity value is less than or equal to the product of the available capacity value and the resynchronization limit; and
initiate, by the cluster resource manager, the identified next resynchronization operation.

5. The system of claim 1, wherein the queue data structure includes a plurality of operation category queues, each operation category queue being associated with a defined operation category;
wherein adding the proposed resynchronization operation to the queue data structure includes identifying an operation category of the proposed resynchronization operation and adding the proposed resynchronization operation to the operation category queue of the queue data structure that is associated with the identified operation category; and
wherein accessing the resynchronization operation from the queue data structure includes accessing the resynchronization operation from an operation category queue of the plurality of operation category queues based on at least one operation category priority rule.

6. The system of claim 5, wherein the plurality of operation category queues includes at least one of an operation category queue for a repair category, an operation category queue for a maintenance category, an operation category queue for a resource balancing category, or an operation category queue for a configuration category.

7. The system of claim 1, wherein initiating the accessed resynchronization operation on the cluster is further based on the cluster resource manager obtaining control of a shared resynchronization lock module associated with the cluster; and
further comprising the cluster resource manager releasing control of the shared resynchronization lock module based on completion of the initiated resynchronization operation, whereby the shared resynchronization lock module is made available for control by other entities.

8. A computerized method for throttling resynchronization operations in a cluster of distributed data stores based on input/output (I/O) bandwidth limits, the method comprising:
based on receiving a proposed resynchronization operation associated with the cluster, adding, by a cluster resource manager, the proposed resynchronization operation to a queue data structure;
accessing, by the cluster resource manager, a resynchronization operation in the queue data structure, the accessed resynchronization operation including a resynchronization capacity value indicating an amount of data storage space of the cluster to be used during performance of the accessed resynchronization operation;
determining, by the cluster resource manager, a total transient capacity value indicating an amount of data storage space of the cluster that is used by resynchronization operations;
obtaining, by the cluster resource manager, an available capacity value indicating an amount of data storage space of the cluster that is available for use;
identifying, by the cluster resource manager, a resynchronization limit of the cluster, wherein the resynchronization limit indicates a maximum percentage of input/output (I/O) bandwidth of the cluster that is for use by resynchronization operations;
based on a sum of the resynchronization capacity value and the total transient capacity value being less than or equal to a product of the resynchronization limit and the available capacity value, initiating, by the cluster resource manager, the accessed resynchronization operation on the cluster, whereby free space is maintained in the cluster for use by user operations.

9. The computerized method of claim 8, further comprising:
based on the sum of the resynchronization capacity value and the transient capacity value being greater than the product of the resynchronization limit and the available capacity value, delaying, by the cluster resource manager, the accessed resynchronization operation;
based on delaying the accessed resynchronization operation, periodically determining, by the cluster resource manager, the total transient capacity value and the available capacity; and
based on the sum of the resynchronization capacity value and the transient capacity value being less than or equal to the product of the resynchronization limit and the available capacity value, initiating the delayed resynchronization operation.

10. The computerized method of claim 9, wherein delaying the accessed resynchronization operation includes moving the accessed resynchronization operation from a new operation queue of the queue data structure to a delayed operation queue of the queue data structure; and
wherein accessing the resynchronization operation in the queue data structure includes prioritizing resynchronization operations in the delayed operation queue at a higher priority than resynchronization operations in the new operation queue.

11. The computerized method of claim 9, further comprising:
based on delaying the accessed resynchronization operation, identifying, by the cluster resource manager, a next resynchronization operation in the queue data structure, wherein a sum of a next resynchronization capacity value of the next resynchronization operation and the total transient capacity value is less than or equal to the product of the available capacity value and the resynchronization limit; and
initiating, by the cluster resource manager, the identified next resynchronization operation.

12. The computerized method of claim 8, wherein the queue data structure includes a plurality of operation category queues, each operation category queue being associated with a defined operation category;
wherein adding the proposed resynchronization operation to the queue data structure includes identifying an operation category of the proposed resynchronization operation and adding the proposed resynchronization operation to the operation category queue of the queue data structure that is associated with the identified operation category; and
wherein accessing the resynchronization operation from the queue data structure includes accessing the resynchronization operation from an operation category queue of the plurality of operation category queues based on at least one operation category priority rule.

13. The computerized method of claim 12, wherein the plurality of operation category queues includes at least one of an operation category queue for a repair category, an operation category queue for a maintenance category, an operation category queue for a resource balancing category, or an operation category queue for a configuration category.

14. The computerized method of claim 8, wherein initiating the accessed resynchronization operation on the cluster is further based on the cluster resource manager obtaining control of a shared resynchronization lock module associated with the cluster; and
further comprising the cluster resource manager releasing control of the shared resynchronization lock module based on completion of the initiated resynchronization operation, whereby the shared resynchronization lock module is made available for control by other entities.

15. One or more non-transitory computer readable storage media having computer-executable instructions for throttling resynchronization operations in a cluster of distributed data stores based on input/output (I/O) bandwidth limits that, upon execution by a processor, cause the processor to at least:
based on receiving a proposed resynchronization operation associated with the cluster, add, by a cluster resource manager, the proposed resynchronization operation to a queue data structure;
access, by the cluster resource manager, a resynchronization operation in the queue data structure, the accessed resynchronization operation including a resynchronization capacity value indicating an amount of data storage space of the cluster to be used during performance of the accessed resynchronization operation;
determine, by the cluster resource manager, a total transient capacity value indicating an amount of data storage space of the cluster that is used by resynchronization operations;
obtain, by the cluster resource manager, an available capacity value indicating an amount of data storage space of the cluster that is available for use; identify, by the cluster resource manager, a resynchronization limit of the cluster, wherein the resynchronization limit indicates a maximum percentage of I/O bandwidth of the cluster that is for use by resynchronization operations;
based on a sum of the resynchronization capacity value and the total transient capacity value being less than or equal to a product of the resynchronization limit and the available capacity value, initiate, by the cluster resource manager, the accessed resynchronization operation on the cluster, whereby free space is maintained in the cluster for use by user operations.

16. The one or more computer storage media of claim 15, wherein the computer-executable instructions, upon execution by a processor, further cause the processor to at least:
based on the sum of the resynchronization capacity value and the transient capacity value being greater than the product of the resynchronization limit and the available capacity value, delay, by the cluster resource manager, the accessed resynchronization operation;
based on delaying the accessed resynchronization operation, periodically determine, by the cluster resource manager, the total transient capacity value and the available capacity; and
based on the sum of the resynchronization capacity value and the transient capacity value being less than or equal to the product of the resynchronization limit and the available capacity value, initiate the delayed resynchronization operation.

17. The one or more computer storage media of claim 16, wherein delaying the accessed resynchronization operation includes moving the accessed resynchronization operation from a new operation queue of the queue data structure to a delayed operation queue of the queue data structure; and
wherein accessing the resynchronization operation in the queue data structure includes prioritizing resynchronization operations in the delayed operation queue at a higher priority than resynchronization operations in the new operation queue.

18. The one or more computer storage media of claim 16, wherein the computer-executable instructions, upon execution by a processor, further cause the processor to at least:
based on delaying the accessed resynchronization operation, identify, by the cluster resource manager, a next resynchronization operation in the queue data structure, wherein a sum of a next resynchronization capacity value of the next resynchronization operation and the total transient capacity value is less than or equal to the product of the available capacity value and the resynchronization limit; and
initiate, by the cluster resource manager, the identified next resynchronization operation.

19. The one or more computer storage media of claim 15, wherein the queue data structure includes a plurality of operation category queues, each operation category queue being associated with a defined operation category;
wherein adding the proposed resynchronization operation to the queue data structure includes identifying an operation category of the proposed resynchronization operation and adding the proposed resynchronization operation to the operation category queue of the queue data structure that is associated with the identified operation category; and wherein accessing the resynchronization operation from the queue data structure includes accessing the resynchronization operation from an operation category queue of the plurality of operation category queues based on at least one operation category priority rule.

20. The one or more computer storage media of claim 19, wherein the plurality of operation category queues includes at least one of an operation category queue for a repair category, an operation category queue for a maintenance category, an operation category queue for a resource balancing category, or an operation category queue for a configuration category.

* * * * *